United States Patent

Kristen et al.

[11] Patent Number: 5,840,949
[45] Date of Patent: Nov. 24, 1998

[54] RECOVERY OF METALLOCENE COMPLEXES

[75] Inventors: Marc Oliver Kristen, Limburgerhof; Peter Jutzi; Thomas Redeker, both of Bielefeld, all of Germany

[73] Assignee: BASF Aktiengesellschaft, Ludwigshafen, Germany

[21] Appl. No.: 847,487

[22] Filed: Apr. 25, 1997

[30] Foreign Application Priority Data

May 4, 1996 [DE] Germany .................. 196 180 07.4

[51] Int. Cl.⁶ .................. C07F 17/00; C07F 19/00; C07F 7/28
[52] U.S. Cl. .................. 556/11; 556/12; 556/21; 556/28; 556/30; 556/43; 556/52; 526/160; 526/943; 502/103; 502/117
[58] Field of Search .................. 556/11, 12, 21, 556/28, 30, 43, 52; 526/160, 943; 502/103, 117

[56] References Cited

U.S. PATENT DOCUMENTS

| | | | |
|---|---|---|---|
| 4,794,096 | 12/1988 | Ewen | 502/117 |
| 5,371,260 | 12/1994 | Sangokoya | 556/171 |
| 5,391,793 | 2/1995 | Marks et al. | 556/179 |
| 5,428,127 | 6/1995 | Asanuma et al. | 528/497 |
| 5,432,424 | 7/1995 | Baron | 526/68 |

FOREIGN PATENT DOCUMENTS

| | | |
|---|---|---|
| 284 708 | 10/1988 | European Pat. Off. |
| 621 279 | 1/1994 | European Pat. Off. |
| 633 264 | 1/1995 | European Pat. Off. |
| 19602543 | 7/1997 | Germany . |
| 91/09882 | 7/1991 | WIPO . |

OTHER PUBLICATIONS

Derwent Abstract, Section Ch, Week 9405, Class A12, AN 94–041130 (English abstract of SU 666 784, Nov. 15, 1992).
Flores et al., *Organometallics*, vol. 13, No. 11, Nov. 1994, pp. 4140–4142.
Journal of Organometallic Chemistry, 1992, 423, 31–38.
Journal of Organometallic Chemistry, 1994, 480, C18–C19.
Journal of Organometallic Chemistry, 1995, 486, 287–289.

*Primary Examiner*—Porfirio Nazario-Gonzalez
*Attorney, Agent, or Firm*—Keil & Weinkauf

[57] ABSTRACT

Metallocene complexes of the formula I

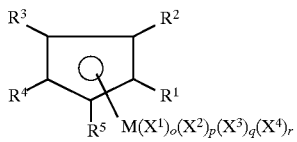

where
M is titanium, zirconium, hafnium, vanadium, niobium or tantalum,
$R^1$ and $R^4$ are as defined in the specification
Y is nitrogen, phosphorus, arsenic, antimony or bismuth,
Z is oxygen, sulfur, selenium or tellurium,
n is an integer from 0 to 10,
$R^5$ is

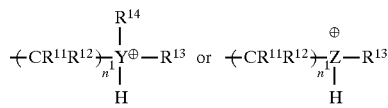

$R^{11}$ to $R^{14}$ and m are as defined in the specification, and $X^1$ to $X^4$ are each fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^{15}$—, —$NR^{15}R^{16}$ or

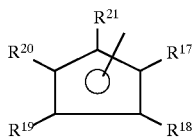

and $R^{15}$ to $R^{21}$ are as defined in the specification. The complexes are used as catalyst components for polymerizing olefins.

6 Claims, No Drawings

RECOVERY OF METALLOCENE COMPLEXES

The present invention relates to processes for recovering metallocene complexes of the general formula I

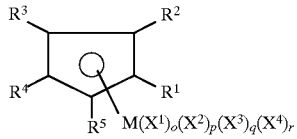

where

M is titanium, zirconium, hafnium, vanadium, niobium or tantalum, $R^1$ to $R^4$ are each hydrogen, $C_1$–$C_{10}$-alkyl, 5–7-membered cycloalkyl which in turn may carry $C_1$–$C_{10}$-alkyl as a substituent, $C_6$–$C_{15}$-aryl or arylalkyl, and two adjacent radicals together may furthermore form a cyclic group of 4 to 15 carbon atoms, $Si(R^6)_3$,

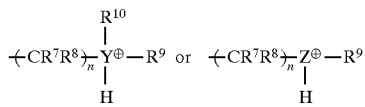

$R^6$ is $C_1$–$C_{10}$-alkyl, $C_6$–$C_{15}$-aryl or $C_3$–$C_{10}$-cycloalkyl, $R^7$ and $R^8$ are each hydrogen, $C_1$–$C_{10}$-alkyl, $C_6$–$C_{15}$-aryl or $C_3$–$C_{10}$-cycloalkyl, $R^9$ and $R^{10}$ are each $C_1$–$C_{10}$-alkyl, $C_6$–$C_{15}$-aryl or $C_3$–$C_{10}$-cycloalkyl, Y is nitrogen, phosphorus, arsenic, antimony or bismuth, Z is oxygen, sulfur, selenium or tellurium, n is an integer from 0 to 10, $R^5$ is

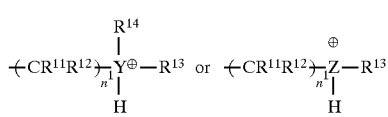

$R^{11}$ and $R^{12}$ are each hydrogen, $C_1$–$C_{10}$-alkyl, $C_6$–$C_{15}$-aryl or $C_3$–$C_{10}$-cycloalkyl, $R^{13}$ and $R^{14}$ are each, $C_1$–$C_{10}$-alkyl, $C_6$–$C_{15}$-aryl or $C_3$–$C_{10}$-cycloalkyl, $n^1$ is an integer from 0 to 10, $X^1$ to $X^4$ are each fluorine, chlorine, bromine, iodine, hydrogen, $C_{10}$–$C_{10}$-alkyl, $C_6$–$C_{15}$-aryl, alkylaryl having 1 to 10 carbon atoms in the alkyl radical and 6 to 20 carbon atoms in the aryl radical, $-OR^{15}-$, $-NR^{15}R^{16}$ or

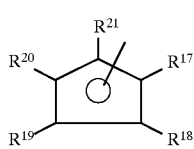

$R^{15}$ and $R^{16}$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^{17}$ to $R^{21}$ are each hydrogen, $C_1$–$C_{10}$-alkyl, 5–7-membered cycloalkyl which in turn may carry $C_1$–$C_{10}$-alkyl as a substituent, $C_6$–$C_{15}$-aryl or arylalkyl, and two adjacent radicals together may furthermore form a cyclic group of 4 to 15 carbon atoms, $Si(R^{22})_3$,

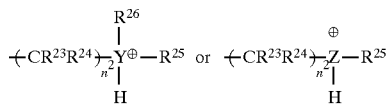

$R^{22}$ is $C_1$–$C_{10}$-alkyl, $C_6$–$C_{15}$-aryl or $C_3$–$C_{10}$-cycloalkyl, $R^{23}$ and $R^{24}$ are each hydrogen, $C_1$–$C_{10}$-alkyl, $C_6$–$C_{15}$-aryl or $C_3$–$C_{10}$-cycloalkyl, $R^{25}$ and $R^{26}$ are each $C_1$–$C_{10}$-alkyl, $C_6$–$C_{15}$-aryl or $C_3$–$C_{10}$-cycloalkyl, $n^2$ is an integer from 0 to 10 and o, p, q, r are each an integer from 0 to 4, the sum o+p+q+r+1 corresponding to the valency of M, which were used as active catalyst components in the preparation of polymers of $C_2$–$C_{10}$-alkenes.

The present invention furthermore relates to the use of the recovered metallocene complexes for the preparation of polymers of $C_2$–$C_{10}$-alkenes and to processes for the preparation of these polymers.

The use of metallocene complexes as active catalyst components for the preparation of polyolefins is known. A large number of industrial polymerization processes were developed, in which however the metallocene complex remains in the polymer prepared. However, the polymer is thus contaminated with the metallocene complex and in addition the expensive metallocene complex is lost in this manner.

It is an object of the present invention to provide a process for recovering metallocene complexes.

We have found that this object is achieved by processes for recovering metallocene complexes of the general formula I which were used as active catalyst components in the preparation of polymers of $C_2$–$C_{10}$-alkenes, wherein the polymerization is stopped by adding an acid and the metallocene complexes of the general formula I are recovered by extraction from the reaction mixture.

We have also found the use of the recovered metallocene complexes for the preparation of polymers of $C_2$–$C_{10}$-alkenes and processes for the preparation of these polymers.

Preferred metallocene complexes of the general formula I which are used in the novel process are those in which M is titanium, zirconium or hafnium, in particular titanium, $R^1$ to $R^4$ are each hydrogen, $C_1$–$C_6$-alkyl or $C_6$–$C_{15}$-aryl, in particular hydrogen, or two adjacent radicals may form a cyclic group of 8 to 12 carbon atoms, $R^5$ is

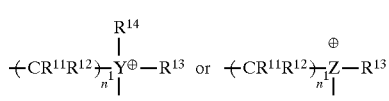

$R^{11}$ and $R^{12}$ are each hydrogen or $C_1$–$C_4$-alkyl, in particular hydrogen, methyl or ethyl, $R^{13}$ and $R^{14}$ are each $C_1$–$C_6$-alkyl, in particular methyl, ethyl, n-propyl, isopropyl, n-butyl or tert-butyl, or phenyl, $n^1$ is an integer from 1 to 4, Y is nitrogen or phosphorus, Z is oxygen or sulfur, $X^1$ to $X^4$ are each chlorine, $C_1$–$C_4$-alkyl or

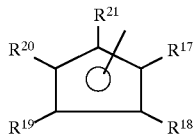

$R^{17}$ to $R^{21}$ are each hydrogen, $C_1$–$C_6$-alkyl or $C_6$–$C_{15}$-aryl, or two adjacent radicals may form a cyclic group of 8 to 12 carbon atoms, $Si(R^{22})_3$ or

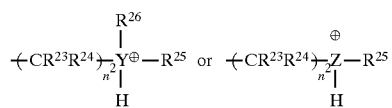

$R^{22}$ is $C_1$–$C_{10}$-alkyl, preferably $C_1$–$C_4$-alkyl, $R^{23}$ and $R^{24}$ are each hydrogen or $C_1$–$C_4$-alkyl, in particular hydrogen, methyl or ethyl, $R^{25}$ and $R^{26}$ are each $C_1$–$C_6$-alkyl, in particular methyl, ethyl, n-propyl, isopropyl, n-butyl or tert-butyl, or phenyl and $n^2$ is an integer from 1 to 4.

Particularly preferred metallocene complexes of the general formula I are those in which $R^5$ is

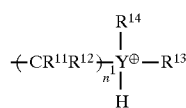

in particular

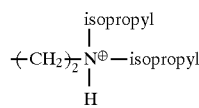

and $R^1$ to $R^4$ are each hydrogen. It is also particularly preferable if M is titanium, if $X^1$, $X^2$ and $X^3$ are each chlorine, o, p and q are each 1 and r is 0 or if $X^1$ and $X^2$ are each chlorine and $X^3$ is

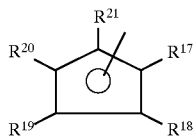

where $R^{17}$ to $R^{20}$ are each hydrogen and $R^{21}$ is trimethylsilyl, and o, p and q are each 1 and r is 0.

Examples of particularly preferred metallocene complexes of the general formula I are:

Trichloro-$\eta^5$-[2-(N,N-diisopropylammonium) ethylcyclopentadienyl]-titanium(IV) chloride Dichloro-di-{$\eta^5$-[2-(N,N-diisopropylammonium) ethylcyclopentadienyl]}-titanium(IV) dichloride Trichloro-$\eta^5$-[2-(N,N-diisopropylammonium) ethylcyclopentadienyl]-zirconium(IV) chloride Dichloro-di-{$\eta^5$-[2-(N,N-diisopropylammonium) ethylcyclopentadienyl]}-zirconium(IV) dichloride Trichloro-$\eta^5$-[2-(N,N-dimethylammonium) ethylcyclopentadienyl]-titanium(IV) chloride Dichloro-di-{$\eta^5$-[2-(N,N-dimethylammonium) ethylcyclopentadienyl]}-titanium(IV) dichloride Trichloro-$\eta^5$-[2-(N,N-dimethylammonium) ethylcyclopentadienyl]-zirconium(IV) chloride Dichloro-di-{$\eta^5$-[2-N,N-dimethylammonium) ethylcyclopentadienyl]}-zirconium(IV) dichloride Dichloro-$\eta^5$-[2-(N,N-diisopropylammonium) ethylcyclopentadienyl]-(trimethylsilyl-cyclopentadienyl)-titanium(IV) chloride Dichloro-$\eta^5$-[2-(N,N-diisopropylammonium) ethylcyclopentadienyl]-(trimethylsilylcyclopentadienyl)-zirconium(IV) chloride Dichloro-cyclopentadienyl-$\eta^5$-[2-(N,N-diisopropylammonium)ethylcy-clopentadienyl]-titanium(IV) chloride Dichloro-cyclopentadienyl-$\eta^5$-[2-(N,N-diisopropylammonium)ethylcy-clopentadienyl]-zirconium(IV) chloride Mixtures of different metallocene complexes I may also have been used.

The metallocene complexes I can be prepared by first preparing the cyclopentadienyl systems functionalized with a heteroatom by reaction of cyclopentadienyllithium or cyclopentadienylsodium with the chloroalkane functionalized with a heteroatom, as described in J. Organometal. Chem. 423 (1992), 31–38, and J. Organometal. Chem. 480 (1994) C18–C19. The corresponding cyclopentadienyl lithium systems functionalized with the heteroatom can then be prepared by reacting the cyclopentadienyl systems functionalized with the heteroatom with alkyllithium, for example n-butyllithium, for example as described in J. Organometal. Chem. 486 (1995), 287–289. These can then preferably be reacted with $MCl_4$ to give the corresponding metallocene complexes, as described in J. Organometal. Chem. 486 (1995), 287–289, although the metallocene complexes do not as yet carry cationically functionalized cyclopentadienyl ligands. The conversion into the metallocene complexes of the general formula I can be effected by adding acids of any type, as described in J. Organometal. Chem. 486 (1995) 287–289.

The addition of these acids gives an ion which has the opposite sign to the metallocene complexes of the general formula I and is derived from the type of acid added. These opposite ions may be, for example, halides, carboxylic acid anions, sulfates, phosphates, carbonates, nitrates, $PF_6^-$, $BF_4^-$ or $HPO_4^{2-}$. The type of opposite ion is not critical. Halides are preferred, in particular chlorides.

In the novel process for recovering metallocene complexes of the general formula I, these metallocene complexes were used as active catalyst components in the preparation of polymers of $C_2$–$C_{10}$-alkenes. The catalyst systems used also contain, as a further active component, compounds forming metallocenium ions.

Suitable compounds forming metallocenium ions are in particular strong, neutral Lewis acids, ionic compounds having Lewis acid cations, ionic compounds having Brönsted acids as cations and alumoxane compounds.

Preferred strong, neutral Lewis acids are compounds of the general formula IV $$M^1X^5X^6X^7 \qquad \qquad IV$$

where $M^1$ is an element of main group III of the Periodic Table, in particular B, Al or Ga, preferably B, and $X^5$, $X^6$ and $X^7$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula IV are those in which $X^5$, $X^6$ and $X^7$ are identical, preferably tris(pentafluorophenyl)borane.

Suitable ionic compounds having Lewis acid cations are compounds of the general formula V

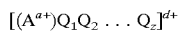

$$[(A^{a+})Q_1Q_2 \ldots Q_z]^{d+} \qquad V$$

where

A is an element of main groups I to VI or of subgroups I to VIII of the Periodic Table, $Q_1$ to $Q_z$ are radicals having a single negative charge, such as $C_1$–$C_{28}$-alkyl, $C_6$–$C_{15}$-aryl, alkylaryl, arylalkyl, haloalkyl, haloaryl, each having 6 to 20 carbon atoms in the aryl radical and 1 to 28 carbon atoms in the alkyl radical, or $C_1$–$C_{10}$-cycloalkyl which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 and d corresponds to the difference a–z, but d is greater than or equal to 1.

Carbonium cations, oxonium cations and sulfonium cations and cationic transition metal complexes are particularly suitable. Particular examples are the triphenylmethyl cation, the silver cation and the 1,1'-dimethylferrocenyl cation. They preferably have noncoordinating opposite ions, in particular boron compounds, as also stated in WO 91/09882, preferably tetrakis(pentafluorophenyl)borate.

Ionic compounds having Brönsted acids as cations and preferably also noncoordinating opposite ions are mentioned in WO 91/09882, the preferred cation being N,N-dimethylanilinium.

Particularly suitable compounds forming metallocenium ions are open-chain or cyclic alumoxane compounds of the general formula II or III

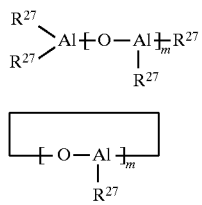

where $R^{27}$ is $C_1$–$C_4$-alkyl, preferably methyl or ethyl, and m is an integer from 5 to 30, preferably from 10 to 25.

The preparation of these oligomeric alumoxane compounds is usually carried out by reacting a solution of the trialkylaluminum with water and is described, inter alia, in EP-A 284 708 and U.S. Pat. No. 4,794,096.

As a rule, the oligomeric alumoxane compounds obtained are present as mixtures of both linear and cyclic chain molecules of different lengths so that m is to be regarded as an average value. The alumoxane compounds may also be present as a mixture with other metal alkyls, preferably with alkylaluminum.

Aryloxyalumoxanes as described in U.S. Pat. No. 5,391,793, aminoalumoxanes as described in U.S. Pat. No. 5,371,260, aminoalumoxane hydrochlorides as described in EP-A 633 264, silyloxyalumoxanes as described in EP-A 621 279 or mixtures thereof may furthermore be used as compounds forming metallocenium ions.

It has proven advantageous to use the metallocene complexes and the oligomeric alumoxane compound in amounts such that the atomic ratio of aluminum from the oligomeric alumoxane compound to the transition metal from the metallocene complexes is from 10:1 to $10^6$:1, in particular from 10:1 to $10^4$:1.

Aromatic hydrocarbons, preferably of 6 to 20 carbon atoms, in particular xylenes and toluene and mixtures thereof, are usually used as solvents for these catalyst systems.

The catalyst systems used in the novel recovery process may also have been used in supported form.

Preferably used carriers are finely divided carriers which preferably have a particle diameter of from 1 to 300 $\mu$m, in particular from 30 to 70 $\mu$m. Examples of suitable carriers are silica gels, preferably those of the formula $SiO_2 \cdot a\, Al_2O_3$, where a is from 0 to 2, preferably from 0 to 0.5; these are therefore aluminosilicates or silica. Such products are commercially available, for example Silica Gel 332 from Grace. Further carriers include finely divided polyolefins, for example finely divided polypropylene, or magnesium chloride.

In the novel process for recovering metallocene complexes of the general formula I, these metallocene complexes have already been used for the preparation of polymers of $C_2$–$C_{10}$-alkenes. This polymerization can be carried out in the gas phase, in suspension, in solution or in liquid monomers. Examples of suitable suspending agents are aliphatic hydrocarbons. The novel process is preferably carried out in solution, preferably in toluene as the solvent.

Here, it has proven particularly preferable if the metallocene complex of the general formula I (with its opposite ion) is suspended in toluene at from –80 to 110° C., and the compound forming metallocenium ions, likewise preferably as a solution in toluene, is added at from 0.5 to 50 bar. The actual polymerization conditions are not critical per se, temperatures of from –50° to 300° C., pressures of from 0.5 to 3000 bar and reaction times of from 0.1 to 24 hours being preferred.

The average molar mass of the resulting polymer can be controlled by the methods usually used in polymerization technology, for example by adding regulators such as hydrogen.

Suitable $C_2$–$C_{10}$-alkenes which may be used for the polymerization are in particular ethylene as well as propylene and higher alk-1-enes, such as but-1-ene, pent-1-ene and hex-1-ene. The term polymers is understood as meaning both homopolymers and copolymers.

The metallocene complexes of the general formula I can be recovered by the novel process by stopping the polymerization by adding an acid and recovering the metallocene complex of the general formula I by extraction from the reaction mixture.

Suitable acids are compounds of any type in which the anion is capable of stabilizing the metallocene cation at the metal M; preferably, the anion forms a bond with the metallocene cation at the metal M. Preferred acids are inorganic acids, such as hydrohalic acids, in particular HCl. However, it is also possible to use organic acids, such as carboxylic acids, for example acetic acid, or substituted carboxylic acids, such as trifluoroacetic acid, or mixtures of different acids.

The acids may be used in concentrated form or as an aqueous and/or alcoholic solution.

The amount of acid is not critical per se, and a molar ratio of acid to metallocene complex of from 10000000:1 to 3:1, in particular from 500000:1 to 1000:1, may be used.

It has proven preferable to add the acid at room temperature and ambient pressure, it is also possible to employ temperatures of from −80° to 200° C. and pressures of from 0.1 to 300 bar.

The extraction is usually carried out in a solvent, and all solvents known per se and suitable for the extraction may be used. Suitable solvents are, for example, water, aromatic hydrocarbons, such as toluene, halohydrocarbons, in particular chlorohydrocarbons, such as chloroform or dichloromethane, ethers, such as diethyl ether or tetrahydrofuran, or alcohols, such as methanol. Mixtures of different solvents may also be used. The type of solvent depends on the type of metallocene complex. However, dichloromethane is preferably used.

The amounts of solvent used for the extraction and the temperature and the pressure are not critical per se. The amount of solvent may be from 1 l to 0.1 l, based on 1 mmol of metallocene complex, the temperature may be from 20° to 150° C. and the pressure may be from 0.1 to 300 bar.

After the extraction, the recovered metallocene complex of the general formula I can be isolated as a solid by removing the solvent and, if required, washing the metallocene complex.

The metallocene complexes of the general formula I which are recovered by the novel process can be reused as active catalyst components for the preparation of polymers of $C_2$–$C_{10}$-alkenes. Details in this context are surplus since the metallocene complex recovered can be used similarly to the freshly prepared metallocene complex, and reference may therefore be made to existing publications.

Here too, a compound forming metallocenium ions (component B)) is used as a further active catalyst component and the polymerization process corresponds to that already described, it being possible to stop the polymerization by adding acids. The novel process for recovering metallocene complexes of the general formula I can be carried out several times, preferably up to 10 times, in succession. It is also possible to use mixtures of a plurality of recovered metallocene complexes of the general formula I or mixtures of recovered metallocene complex and fresh metallocene complex, said complexes preferably having the same chemical structure. The ratio of recovered metallocene complex to fresh metallocene complex may be varied within any desired limits.

When recovered metallocene complex of the general formula I is used for the preparation of polymers of $C_2$–$C_{10}$-alkenes, ethylene is likewise a preferred monomer, as described above.

The novel process for recovering metallocene complexes is technically simple to carry out, the expensive complexes can be reused without expensive working up, the productivities of the catalyst systems which contain recovered metallocene complexes as active catalyst components are comparable with the productivities of catalyst systems which contain fresh metallocene complexes as active catalyst components, and the polymers formed are not contaminated with metallocene complexes and moreover have properties which correspond to those of polymers which were prepared by means of fresh metallocene complexes.

EXAMPLES

Examples 1 and 2
Preparation of the metallocene complexes I

Example 1
Preparation of

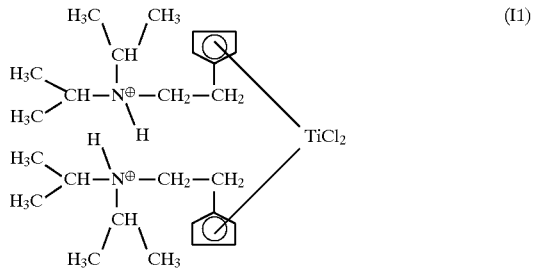

A solution of 20.2 mmol of I'

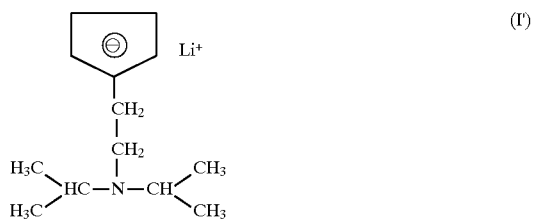

in 80 ml of diethyl ether (prepared from 3.90 g (20.2 mmol) of I*

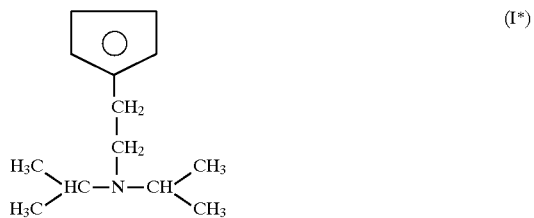

and 12.60 ml (20.2 mmol) of a 1.6 molar solution of n-butyllithium in diethyl ether) was added dropwise at −40° C. to a solution of 1.92 g (10.1 mmol) of $TiCl_4$ in 80 ml of toluene. Thereafter, the reaction mixture was allowed to warm up to room temperature in the course of 6 hours and was stirred for a further 10 hours. The precipitated solid was separated off by decanting and the residue was washed with 2×30 ml of cold (−40° C.) pentane. A deep red solid was obtained. Recrystallization from toluene gave red crystals. Yield: 2.50 g (49%). M.p.: 156° C. (decomposition).

$^1$H-NMR (CDCl$_3$): δ=0.92 (d, $^3$J=6.5 Hz, 24H, CH—C$\underline{H}_3$), 2.62 (m, 4H, Cp-C$\underline{H}_2$), 2.69 (m, 4H, N—C$\underline{H}_2$), 2.99 (m, 4H, C$\underline{H}$—CH$_3$), 6.32–6.36 (m, 8H, Cp-$\underline{H}$). $^1$H-NMR (C$_6$D$_6$): δ=0.90 (d, $^3$J=6.6 Hz, 24H, CH—C$\underline{H}_3$), 2.60 (m, 4H, Cp-C$\underline{H}_2$), 2.93 (m, 8H, N—C$\underline{H}_2$, C$\underline{H}$—CH$_3$), 5.76 (m, 4H, Cp-$\underline{H}$), 6.13 (m, 4H, Cp-$\underline{H}$).

$^{13}$C-NMR (C$_6$D$_6$): δ=21.0 (CH—$\underline{C}$H$_3$), 33.1 (Cp-$\underline{C}$H$_2$), 45.6 ($\underline{C}$H$_2$—N), 48.2 ($\underline{C}$H—CH$_3$), 114.6, 122.9 (Ring-$\underline{C}$H=), 136.7 (Ring=$\underline{C}$—CH$_2$—CH$_2$).

MS (LSIMS) [m/z (rel. Int. %)]: 503 (3) [M$^+$+1H], 468 (3) [M$^+$−2Cl], 114 (100) [i(C$_3$H$_7$)$_2$NCH$_2$CH$_2^{+}$] 65 (8) [C$_5$H$_5^{+}$]

CHN: C$_{26}$H$_{44}$Cl$_4$N$_2$Zr(503.43). Calculated: C 62.03 H 8.80 N 5.56 Found: C 61.92 H 8.68 N 5.43

Cl analysis (according to Schöninger) Calculated: 14.08 Found: 12.97

15 ml of HCl-saturated methanol solution were added to 550 mg (1.09 mmol) of this product and stirring was carried out for 30 minutes. Removal of the solvent under reduced pressure gave a reddish brown solid. Yield: 628 mg (quantitative). M.p.: 144° C. (decomposition).

$^1$H-NMR (CD$_3$OD): δ=1.39, 1.40 (2d, $^3$J=6.6 Hz, 24H, CH—CH$_3$), 3.33 (m, 4H, Cp-C$\underline{H}_2$), 3.56 (m, 4H, N—C$\underline{H}_2$), 3.78 (m, 4H, C$\underline{H}$—CH$_3$), 6.44 (m, 4H, Cp-$\underline{H}$), 6.74 (m, 4H, Cp-$\underline{H}$).

$^{13}$C-NMR (CD$_3$OD): δ=17.2, 18.8 (CH—CH$_3$), 29.2 (Cp-CH$_2$), 47.3 (CH$_2$—N), 56.5 (CH—CH$_3$), 115.8, 125.1 (Ring —CH=), 132.6 (Ring —CH=), 132.6 (Ring = C—CH$_2$—CH$_2$).

CHN: C$_{26}$H$_{46}$Cl$_4$N$_2$Ti (576.35). Calculated:C 54.18 H 8.04N 4.86 Found: C 53.89 H 8.30N 4.72

Cl analysis (according to Schöninger) Calculated: 24.60 Found: 26.33

Example 2

Preparation of

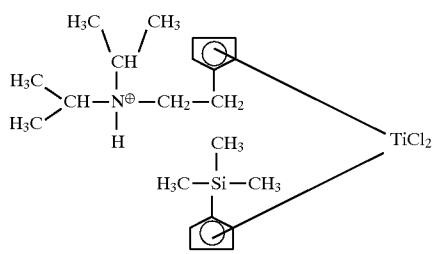 (I2)

A solution of 3.43 mmol of I' in 20 ml of diethyl ether (prepared from 0.66 g (3.43 mmol) of I* and 2.14 ml (3.43 mmol) of a 1.6 molar solution of n-butyllithium in hexane) was added dropwise at −30° C. to a solution of 1 g (3.43 mmol) of (η$^5$-C$_5$H$_4$Si(CH$_3$)$_3$)TiCl$_3$ in 40 ml of toluene. Thereafter, the reaction mixture was allowed to warm up to room temperature in the course of 1 hour and was stirred for a further 5 hours. The precipitated solid was separated off by decanting and the residue was washed with 2×20 ml of cold pentane. An orange-red solid was obtained. Yield: 0.82 g (53%), m.p.: 170° C.

$^1$H-NMR(C$_6$D$_6$): δ=0.30 (s, 9H, Si—CH$_3$), 0.89 (d, $^3$J=5.5 Hz, 12H, CH—CH$_3$), 2.61 (m, 2H, Cp-CH$_2$), 2.93 (m, 4H, N—CH$_2$, CH—CH$_3$), 5.74, 6.12 (2m, 4H, Cp-H), 5.97, 6.46 (2m, 4H, Cp-H).

$^{13}$C-NMR(C$_6$D$_6$): δ=0.10 (Si—CH$_3$), 21.0 (CH—CH$_3$), 32.9 (Cp-CH$_2$), 45.6 (CH$_2$—N), 48.2 (CH—CH$_3$), 114.0, 124.3 (Cp$^-$C), 119.1, 129.3 (Cp-C).

$^{29}$Si-NMR (C$_6$D$_6$): δ=−6.8 (Si—CH$_3$).

MS (CI) [m/z (rel. Int. %)]: 448 (0,5) [M$^+$], 413 (1) [M$^+$-Cl], 377 (5) [M$^+$-2Cl], 114 (100) [i-(C$_3$H$_7$)$_2$NCH$_2^+$].

CHN: C$_{21}$H$_{35}$Cl$_2$NTiSi (448.38) Calculated: C 56.25 H 7.86 N 3.12 Found: C 56.34 H 7.48 N 2.41

10 ml of HCl-saturated methanol solution were added to 350 mg (0.73 mmol) of this product and stirring was carried out for 30 minutes. After removal of the solvent under reduced pressure, the residue was washed with 2×20 ml of diethyl ether. A red, amorphous, very hygroscopic solid was obtained. Crystallization from CH$_2$Cl$_2$/toluene gave red crystals. Yield: 300 mg (0.62 mmol, 85%). M.p.: 163° C. (decomposition).

$^1$H-NMR (CD$_3$OD): δ=0.25 (s, 9H, Si—CH$_3$), 1.40, 1.41 (2d, $^3$J=6.6 Hz, 12H, CH—CH$_3$), 3.30 (m, 2H, Cp-CH$_2$), 3.60 (m, 2H, N—CH$_2$), 3.77 (m, 2H, CH—CH$_3$), 6.36 (t, $^3$J=2.7 Hz, 2H, Cp-H), 6.76 (t, $^3$J=2.5 Hz, 2H, Cp-H), 6.71 (t, $^3$J=2.5 Hz, 2H, Cp-H), 6.93 (t, $^3$J=2.5 Hz, 2H, Cp-H).

$^1$H-NMR (CD$_3$CN): δ=0.23 (s, 9H, Si—CH$_3$), 1.35, 1.42 (2d, $^3$J=6.6 Hz, 12H, CH—CH$_3$), 3.36 (m, 4H, Cp-CH$_2$, N—CH$_2$), 3.63 (m, 2H, CH—CH$_3$), 6.36 (t, $^3$J=2.6 Hz, 2H, Cp-H), 6.60 (t $^3$J=2.7 Hz, 2H, Cp-H), 6.70 (t, $^3$J=2.5 Hz, 2H, Cp-H), 6.92 (t, $^3$J=2.6 Hz, 2H, Cp-H).

$^1$H-NMR (CDCl$_3$): δ=0.21 (s, 9H, Si—CH$_3$), 1.41, 1.49 (2d, $^3$J=6.6 Hz, 12H, CH—CH$_3$), 3.50 (m, 4H, Cp-CH$_2$, N–CH$_2$), 3.64 (m, 2H, CH—CH$_3$), 6.23 (t, $^3$J=2.6 Hz, 2H, Cp-H), 6.42 (t, $^3$J=2.6 Hz, 2H, Cp-H), 6.61 (t, $^3$J=2.3 Hz, 2H, Cp-H), 6.85 (t, $^3$J=2.6 Hz, 2H, Cp-H), 11.2 (br. m, 1H, N—H).

$^{13}$C-NMR (CD$_3$OD): δ=0.0 (Si—CH$_3$), 17.4, 19.0 (CH—CH$_3$), 29.2 (Cp-CH$_2$), 47.6 (CH$_2$—N), 56.7 (CH—CH$_3$), 114.7, 126.5, 131.9 (Cp-C), 122.4, 130.1, 134.7 (Cp-C).

$^{29}$Si-NMR (CD$_3$OD): δ=−6.09 (Si—CH$_3$),

CHN: C$_{21}$H$_{36}$Cl$_3$NTiSi (484.84) Calculated: C 52.02 H 7.48 N 2.88 Found: C 52.50 H 8.02 N 2.93.

Examples 3 and 4

Preparation of polyethylene (PE) using fresh metallocene complex and recovery of the metallocene complex The metallocene complexes I1 and I2 (from Examples 1 and 2) were each suspended in toluene at room temperature. Under an ethylene atmosphere (1 bar), a 10% strength solution of methylalumoxane (MAO) in toluene was added dropwise in each case. After 5 minutes, the solution slowly became cloudy as a result of the formation of PE and warmed up. After a reaction time, the polymerization was stopped by adding 500 ml of methanolic/aqueous HCl (400 ml of methanol, 100 ml of concentrated HCl). The PE was filtered off, washed with water and acetone in Example 3 and with dilute HCl and water in Example 4 and dried until the weight was constant. The filtrate was evaporated to dryness and the residue was extracted with dichloromethane (in a Soxhlet apparatus in Example 4). After removal of the solvent and washing with diethyl ether, the respective metallocene complex was isolated as a solid.

Examples 5 and 6

Preparation of PE using recovered metallocene complex

The procedure was as in Examples 3 and 4, except that the metallocene complexes I1 and I2 were metallocene complexes I1W and I2W recovered from Examples 3 and 4. After the polymerization had been stopped by adding 500 ml of methanolic/aqueous HCl as in Examples 3 and 4, the PE was filtered off, washed with water and acetone and dried until the weight was constant.

Comparative Examples V1 and V2

Preparation of PE using fresh metallocene complex

The procedure was as in Examples 5 and 6, except that the metallocene complexes I1 and I2 used were fresh metallocene complexes (from Examples 1 and 2).

The amounts of starting materials, the reaction times and the properties of the resulting polyethylenes are summarized in the table below.

The η value was determined according to ISO 1628-3, and the weight average values M$_w$ and number average values M$_n$ by means of gel permeation chromatography.

TABLE

| Example | Metallocene complex | Toluene [ml] | MAO | Reaction time [h] | Dichloro methane [ml] | Extraction time [h] | Yield of metallocene complex | Yield of PE | Productivity [g of PE/mol xc(C₂H₄)xh] | η value [dl/g] | $M_w$ | $M_n$ | $M_w/M_n$ |
|---|---|---|---|---|---|---|---|---|---|---|---|---|---|
| 3 | 600 mg I1 (1.04 mmol) | 40 | 63 ml (0.104 mol) | 1 | 150 | 0.5 | orange-red 380 mg (63%) | 11.0 g | $0.88 \times 10^4$ | 0.18 | 4300 | 1077 | 4.0 |
| 4 | 1000 mg I2 (2.06 mmol) | 40 | 124 ml (0.21 mol) | 1 | 300 | 5 | red 730 mg (73%) | 5.3 g | $0.26 \times 10^4$ | 0.56 | 3834 | 1493 | 2.6 |
| 5 | 23 mg I1W (40 μmol) | 5 | 12 ml (20 mmol) | 4 | — | — | — | 1.7 g | $1.0 \times 10^4$ | 0.68 | 15836 | 4613 | 3.8 |
| 6 | 42 mg I2W (86.6 μmol) | 20 | 26 ml (43.3 mmol) | 3 | — | — | — | 3. g | $1.2 \times 10^4$ | 0.33 | 14356 | 4708 | 3.1 |
| V1 | 23 mg I1 (40 μmol) | 5 | 12 ml (20 mmol) | 4 | — | — | — | 1.7 g | $1.0 \times 10^4$ | 0.78 | 14621 | 3661 | 4.0 |
| V2 | 42 mg I2 (86.6 μmol) | 20 | 26 ml (43.3 mmol) | 3 | — | — | — | 3.0 g | $1.2 \times 10^4$ | 0.38 | 15237 | 5185 | 2.9 |

We claim:

1. A process for recovering metallocene complexes of the formula I

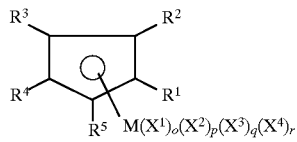

where

M is titanium, zirconium, hafnium, vanadium, niobium or tantalum, $R^1$ to $R^4$ are each hydrogen, $C_1$–$C_{10}$-alkyl, 5–7-membered cycloalkyl which in turn may carry $C_1$–$C_{10}$-alkyl as a substituent, $C_6$–$C_{15}$-aryl or arylalkyl, and two adjacent radicals together may furthermore form a cyclic group of 4 to 15 carbon atoms, $Si(R^6)_3$,

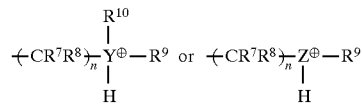

$R^6$ is $C_1$–$C_{10}$-alkyl, $C_6$–$C_{15}$-aryl or $C_3$–$C_{10}$-cycloalkyl, $R^7$ and $R^8$ are each hydrogen, $C_1$–$C_{10}$-alkyl, $C_6$–$C_{15}$-aryl or $C_3$–$C_{10}$-cycloalkyl, $R^9$ and $R^{10}$ are each $C_1$–$C_{10}$-alkyl, $C_6$–$C_{15}$-aryl or $C_3$–$C_{10}$-cycloalkyl, Y is nitrogen, phosphorus, arsenic, antimony or bismuth, Z is oxygen, sulfur, selenium or tellurium, n is an integer from 0 to 10, $R^5$ is

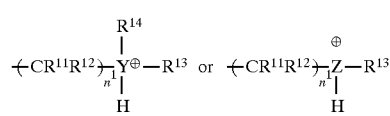

$R^{11}$ and $R^{12}$ are each $C_1$–$C_{10}$-alkyl, $C_6$–$C_{15}$-aryl or $C_3$–$C_{10}$-cycloalkyl, $R^{13}$ and $R^{14}$ are each hydrogen, $C_1$–$C_{10}$-alkyl, $C_6$–$C_{15}$-aryl or $C_3$–$C_{10}$-cycloalkyl, $n^1$ is an integer from 0 to 10, $X^1$ to $X^4$ are each fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, $-OR^{15}-$, $-NR^{15}R^{16}$ or

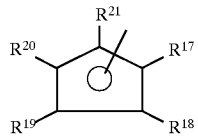

$R^{15}$ and $R^{16}$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^{17}$ to $R^{21}$ are each hydrogen, $C_1$–$C_{10}$-alkyl, 5–7-membered cycloalkyl which in turn may carry $C_1$–$C_{10}$-alkyl as a substituent, $C_6$–$C_{15}$-aryl or arylalkyl, and two adjacent radicals together may furthermore form a cyclic group of 4 to 15 carbon atoms, $Si(R^{22})_3$,

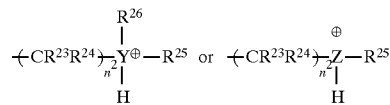

$R^{22}$ is $C_1$–$C_{10}$-alkyl, $C_6$–$C_{15}$-aryl or $C_3$–$C_{10}$-cycloalkyl, $R^{23}$ and $R^{24}$ are each hydrogen, $C_1$–$C_{10}$-alkyl, $C_6$–$C_{15}$-aryl or $C_3$–$C_{10}$-cycloalkyl, $R^{25}$ and $R^{26}$ are each $C_1$–$C_{10}$-alkyl, $C_6$–$C_{15}$-aryl or $C_3$–$C_{10}$-cycloalkyl, $n^2$ is an integer from 0 to 10 and o, p, q, r are each an integer from 0 to 4, the sum o+p+q+r+1 corresponding to the valency of M, which was used as an active catalyst component in the preparation of polymers of $C_2$–$C_{10}$-alkenes, wherein the polymerization is stopped by adding an acid and the metallocene complex of the formula I is recovered by extraction from the reaction mixture.

2. A process as claimed in claim 1, wherein M in the formula I is titanium, zirconium or hafnium.

3. A process as claimed in claim 1, wherein $R^5$ in the formula I is
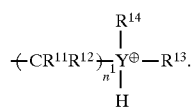
4. A process as claimed in claim 1, wherein $R^5$ in the formula I is
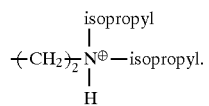
5. A process as claimed in claim 1, wherein the acid used is an inorganic acid.
6. A process as claimed in claim 1, wherein the metallocene complex of the formula I was used as an active component in the preparation of polymers of ethylene.
* * * * *